(12) United States Patent
Johnson

(10) Patent No.: US 8,606,511 B2
(45) Date of Patent: Dec. 10, 2013

(54) METHODS TO IMPROVE ROUTE QUALITY USING OFF-ROUTE DATA

(75) Inventor: Richard A. Johnson, Rochester Hills, MI (US)

(73) Assignee: General Motors, LLC, Detroit, MI (US)

( * ) Notice: Subject to any disclaimer, the term of this patent is extended or adjusted under 35 U.S.C. 154(b) by 411 days.

(21) Appl. No.: 12/959,541

(22) Filed: Dec. 3, 2010

(65) Prior Publication Data

US 2012/0143492 A1 Jun. 7, 2012

(51) Int. Cl.
*G01C 21/26* (2006.01)

(52) U.S. Cl.
USPC .......................................... 701/414; 340/988

(58) Field of Classification Search
USPC ................. 701/117, 400, 408, 414, 423, 435; 340/988, 995.13, 995.19, 995.24
See application file for complete search history.

(56) References Cited

U.S. PATENT DOCUMENTS

| | | | |
|---|---|---|---|
| 6,405,130 B1 * | 6/2002 | Piwowarski | 701/411 |
| 7,035,734 B2 * | 4/2006 | Shaffer et al. | 701/414 |
| 8,055,443 B1 * | 11/2011 | Uyeki et al. | 701/414 |

* cited by examiner

*Primary Examiner* — Dalena Tran
(74) *Attorney, Agent, or Firm* — Leydig, Voit & Mayer, Ltd

(57) ABSTRACT

The described principles provide a method and system for identifying potentially closed roads and potentially open roads based on reroute requests, and of accommodating the potential road closure. If a reroute request is received from a user on a given route, the avoided roads of the route may be deemed potentially closed. If a predetermined number or a statistically significant number of users treat the road as potentially closed in this manner, it may be deemed closed. Similarly, if a supposedly closed road is chosen by a predetermined number of users, as evidenced by reroute requests, then the supposedly closed road may be deemed to be open. Moreover, observation of reroute requests also allows the system to automatically learn a user's route preferences.

20 Claims, 5 Drawing Sheets

METHODS TO IMPROVE ROUTE QUALITY USING OFF-ROUTE DATA

BACKGROUND OF THE INVENTION

In-vehicle telematics systems provide an increasingly broad spectrum of services to users, such as entertainment, emergency notification, and so on. However, one of the most popular services provided by such systems is still navigational assistance. In this role, the telematics unit receives or generates a route starting point and a route ending point, and then generates a series of directions for taking the user from the starting point to the ending point. Since the user is most often in a road vehicle, the directions often take the form of directions to take certain roads for certain distances or until certain turning points. These are sometimes referred to as turn-by-turn directions.

For such directions to be optimally effective, however, it is important for the telematics device to have an awareness of current roads and their availability. For example, when a new roadway has been added to the road system, this may provide a better route for a given trip, and should be available for routing in that case. Similarly, when a road has been removed permanently or temporarily from the road system, this information is also important in providing correct and efficient navigational assistance to a user.

While road removal and road addition changes have been traditionally accounted for by way of map update packages, one class of road changes remains difficult to account for. In particular, temporary road closures which are of too immediate an effect and too short a duration to be included in map update packages are often unannounced and unknown to navigational assistance devices. An unknown temporary road closure can have a significant negative impact on a user's navigation experience.

Moreover, when a road is known to have been closed, the subsequent reopening of that road may allow more efficient routing of telematics users. However, as with road closure information, road reopening information is also not routinely widely available for consideration by telematics units in calculating turn-by-turn directions. Thus, a system and method are needed for enabling a vehicle telematics device to become aware of temporary road closures and subsequent reopenings.

BRIEF SUMMARY OF THE INVENTION

The invention provides a system and apparatus for enabling a vehicle telematics device to detect and account for unannounced road closures and reopenings. The described process operates without direct observation of the road condition, since road condition information is difficult to obtain by direct means, i.e., checking schedules of road crews or events, engaging in physical observation of the road itself, soliciting informal reports of road conditions by users, etc.

In an aspect, the described principles allow the system and method to automatically detect when a closed road has reopened while minimizing inconvenience to the population of route guidance users that would use that road if it were open. An analysis of reroute requests and road usage is used in one implementation to flag roads as open or closed.

In an implementation, if a reroute request is received from a user on a given route, the avoided roads of the route may be deemed potentially closed. If a predetermined number or a statistically significant number of users treat the road as potentially closed in this manner, it may be deemed closed. Similarly, if a supposedly closed road is chosen by a predetermined number of users, as evidenced by reroute requests, then the supposedly closed road may be deemed to be open. Moreover, observation of reroute requests also allows the system to automatically learn a user's route preferences.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system for automatically detecting and remedying a road closure through turn-by-turn routing requests and reroute requests.

The invention operates by collecting data across a number of different telematics units and processing the resulting information to extract road closure information. The system also allows the detection of a road reopening when a closed road has reopened while minimizing inconvenience to the population of route guidance users that would use that road if it were open. An analysis of the characteristics of alternate routes and the route with the closed road allows the system to minimize the inconvenience to potential users of that road while still allowing timely detection of road closure and opening status.

Figure 1:
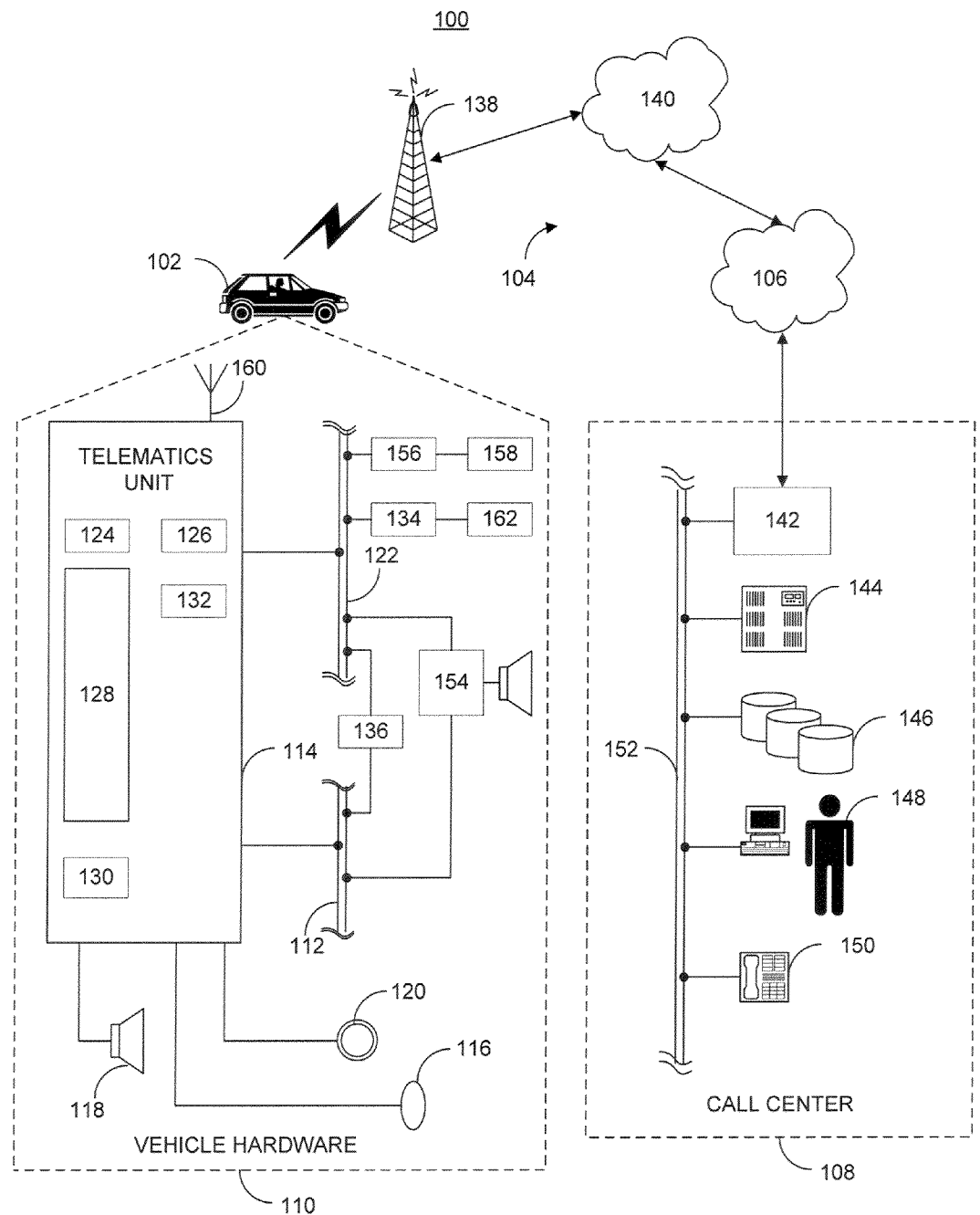
FIG. 1 is a schematic diagram of an operating environment for a mobile vehicle communication system within which the described principles may be implemented.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
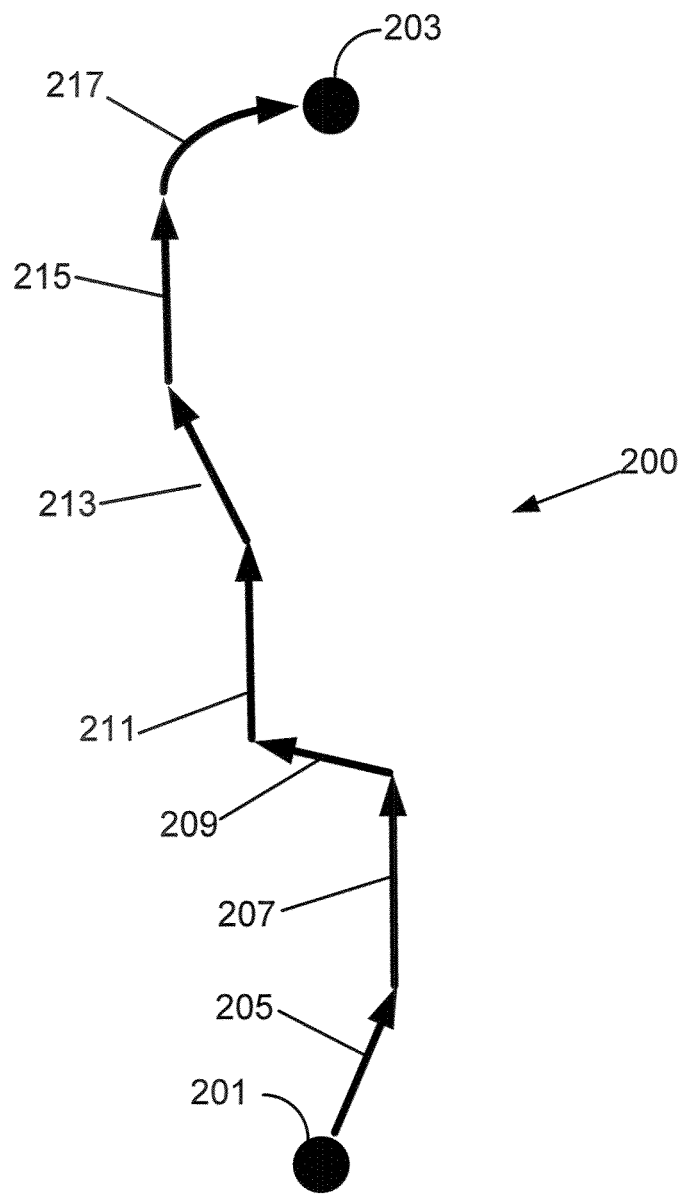
FIG. 2 is a schematic illustration of an example turn-by-turn route.

Turning to the details of an exemplary system operating within the described environment, FIG. 2 is a schematic illustration of a simple example turn-by-turn navigation route 200 to travel from an origination point 201 to a destination point 203. The route 200 is made up of travel segments 205-217. Each segment 205-217 represents a section of road way, also referred to herein as a road. Thus, references to road closure are referring to closure of section of the roadway in a way that that section cannot be traveled in at least the direction that the user would need to travel to complete the route 200.

Figure 3:
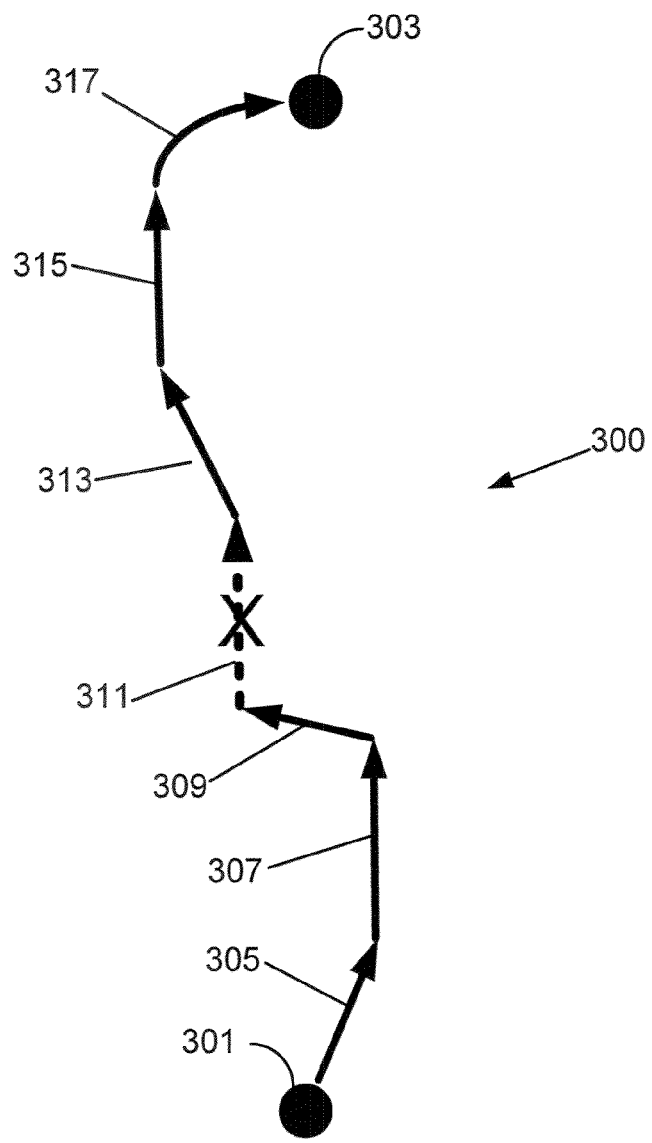
FIG. 3 is a schematic illustration of an example turn-by-turn route showing a road closure within the route, with respect to which the present rerouting system may be applied.

FIG. 3 shows the turn-by-turn navigation route 300, which is the same as route 200, but with a certain road 311 (211) closed. Thus, the user cannot complete the illustrated route 300 because they cannot travel on or past road 311 (211). In this case, the guidance provided by the route 300 (200) is inaccurate and is not useful to the user of the system.

Figure 4:
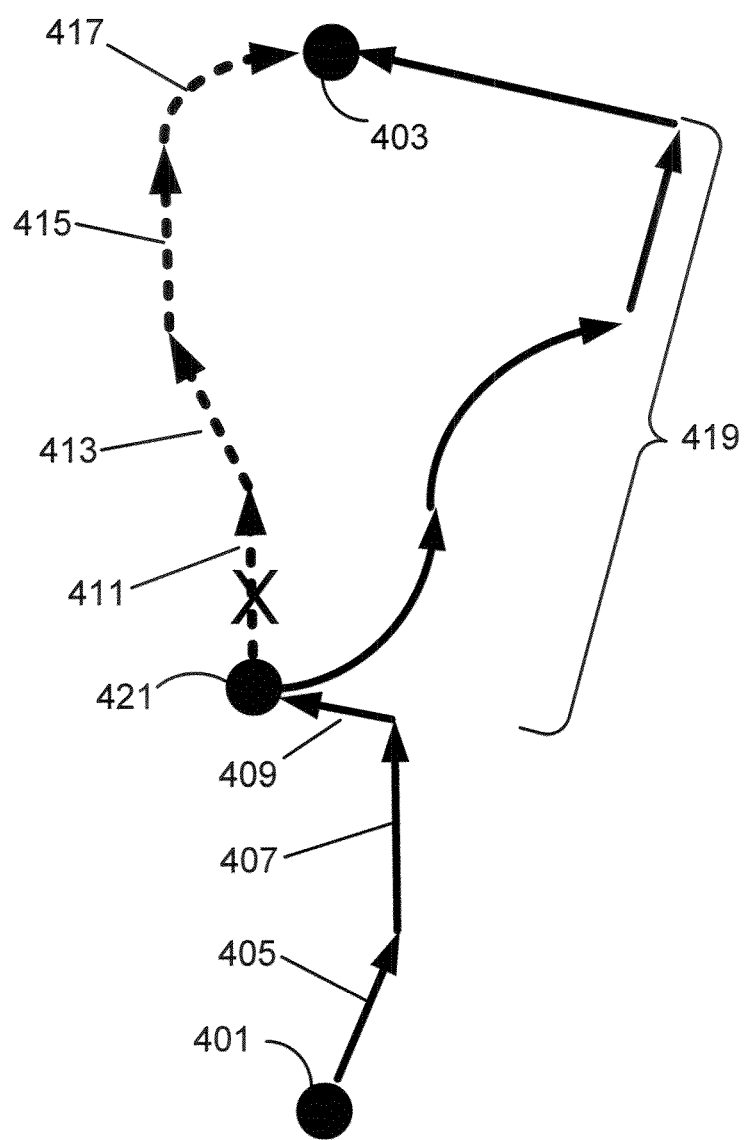
FIG. 4 is a schematic illustration of an example turn-by-turn route showing a road closure within the route and an alternative route including a replacement portion.

Referring now to FIG. 4, the original route 300 (200) is still shown visible, but an alternate route including a replacement portion 419 is also shown. The replacement portion 419 extends from the point 421 where the original route is blocked by the road closure, and extends by way of several segments to the destination point 403. In the illustrated example, the alternative route, including the portion of the original route prior to the point 421 and the replacement portion 419 after the point 421, is less preferred due to length of travel. Indeed, the alternative route will generally be less preferable than the original route based on travel time and/or speed. Thus, it is useful to know when a potentially closed road may be deemed to be reopened.

Thus, a telematics device will be able to provide more accurate and efficient directions if it can acquire information regarding the availability of known roads, i.e., where there is a temporary road closure or a subsequent reopening after such a closure, prior to generating a turn-by-turn route. In one aspect of the described principles, a call center associated with the telematics unit deduces the status of a road as closed or open by making certain computations relative to reroute requests in the area.

In particular, when turn-by-turn directions are provided prior to knowledge of the road closure condition, the user will follow the given directions until reaching the closed road. At that point, the user will generally ask for a reroute around the closed road, causing the telematics unit, via the call center, to generate an alternative route with a replacement portion as noted above. While isolated reroute requests are not necessarily indicative of a road problem, a cluster of such requests may be used to indicate that at least the leg of the journey immediately following the location where the reroute request is made is closed. Similarly, a cluster of reroute requests from the alternative route back to the previously closed road (without yet another reroute request from the previously closed road) may be used to infer that the road in question is now open.

Figure 5:
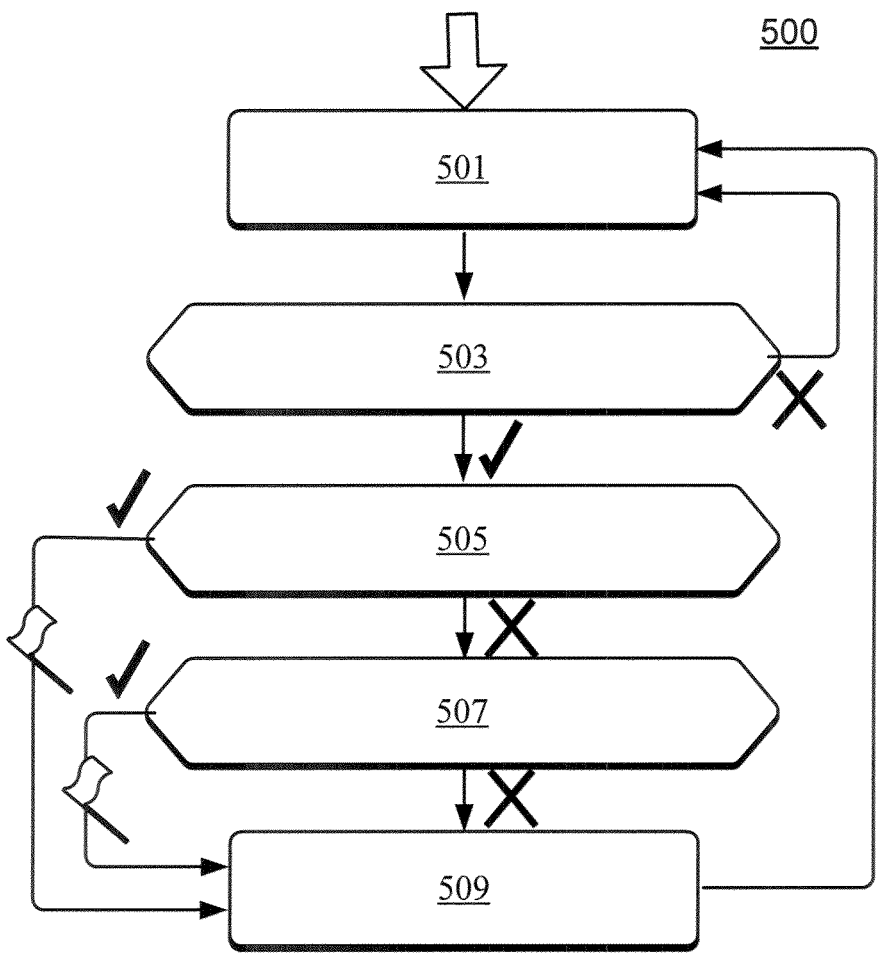
FIG. 5 is flow chart illustrating a process of detecting road closure and opening and using that information in providing routing information to users in accordance with the described principles.

With this in mind, the details of the innovative method and system are further illustrated with reference to FIG. 5, which shows a flowchart of a process 500 for making routing decisions in the presence of a possible road closure. The process 500 begins at stage 501, which assumes a previous route requests and the provision of associated navigation instructions, wherein the call center 108 monitors reroute requests to detect any closed or reopened roads based on such requests. If a reroute request is not detected at stage 503, the process reverts to stage 501 and continues to monitor.

If instead a reroute request is detected at stage 503, the process 500 moves forward to stage 505, wherein the call center 108 determines whether the route request indicates a closed road. In an embodiment of the system, a reroute request is considered to indicate a closed road if it meets all of a set of predetermined criteria. For example, a reroute request may be indicative of a road closure if a large percentage, i.e., 95-100% of routes with that segment generate a reroute request.

If the analysis of the reroute request against the predetermined criteria at stage 505 indicates a closed road, the process flags the road as closed and flows to stage 509 to serve the request. If on the other hand the analysis of the reroute request against the predetermined criteria at stage 505 does not indicate a road closure, then the process flows to stage 507, wherein the call center 108 determines whether the request indicates a reopened road. This determination may be based on any number and type of criteria, but in one implementation, a reroute is considered to indicate a reopened road if it is from a previous alternative route back to a previously closed road. The lack of a future reroute request will confirm that the potentially reopened road is indeed reopened.

If the analysis of the reroute request against the predetermined criteria at stage 507 indicates a reopened road, the process flags the road as open and flows to stage 509 to serve the request. Otherwise, the process flows immediately to stage 509 without flagging the road as open. Once the request is served at stage 509, the process 500 returns to stage 501.

As noted above, the system employs inferences regarding the status of roads based on routing and reroute requests involving routes containing those roads. For examine, if a route is requested and is provided, and there is no associated reroute request within the allotted travel time plus some margin for delays, then the roads on the provided route may be considered driven, and hence open.

Similarly, if the user deviates from the provided route at some point, a reroute request will be generated and served. Assuming that there is no further reroute request during that trip, the roads originally driven will be considered driven and the roads of the replacement portion after the reroute request will be considered chosen and driven, and hence open, while the roads in the original route after the reroute request can be deemed to be avoided, and hence potentially closed.

As a first approximation, all avoided roads are considered potentially closed, while all chosen and driven roads are considered to be open. A road may be considered to be closed if it is deemed to be potentially closed a predetermined number of consecutive occurrences without an interceding open instance or if there are a statistically significant number of potentially closed instances. Of course, if the system successfully detects and hence avoids all closed roads, it will not route users on those roads and will not detect their reopening by affirmative routing.

However, users may be aware of a road reopening and will deviate from a given route onto the supposedly closed roads, generating a reroute request. In this way, the system can observe road reopening. Thus, when a reroute request is detected from an alternative route onto a road previously deemed as closed, the supposedly closed road is now deemed open. In one implementation, the road is deemed potentially open until a certain number of users choose or drive the supposedly closed road, at which time the road is deemed open. Once a road is deemed open, it will be used in provided routes when appropriate to do so unless and until it is again deemed to be closed.

As noted above, the reroute request inference structure may also be used to determine user route preferences as well. For example, if a particular user repeatedly chooses a route as an alternative to a given route even though the given route is open based on the actions of other users, the system may use this information to identify user preferences for the particular user. Thus for example, if the route avoided by the particular user includes toll roads, mountains, highways, etc., the system can use these observed preferences in future routes for that particular user.

The same inference of preference can be applied to users generally, even though the reason for the preference may not be known, if a significant number of users choose to avoid roads known to be open. Thus, for example, if 80% of users routed to a certain road request a reroute, while 20% of users drive the road, the road is known to be open, but is for whatever reason not preferred. Thus, future routes may default to an alternative road over the often avoided road.

It will be appreciated that the disclosed system and method provide a road closure and opening detection mechanism, and also enable the collection and use of user preference information. It will also be appreciated, however, that the foregoing methods and implementations are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing turn-by-turn navigation instructions comprising:
   receiving, at a server at a call center, a request from a user of a vehicle navigation device to receive navigational instructions to enable travel from a geographic origination location to a geographic destination location;
   calculating, at the server, a first set of turn-by-turn navigation instructions defining a first route between the geographic origination location and the geographic destination location and providing the first set of turn-by-turn navigation instructions to the user;
   receiving, at the server, a reroute request from the user at a point on the first route and determining whether a first road on a portion of the first route not yet reached by the user is closed based at least in part on the reroute request;
   calculating, at the server, a second set of turn-by-turn navigation instructions defining a second route between the geographic origination location and the geographic destination based on the reroute request, wherein the second route does not include the first road, and providing the second set of turn-by-turn navigation instructions to the user.

2. The method of providing turn-by-turn navigation instructions according to claim 1, wherein determining whether the first road is closed based at least in part on the reroute request further comprises determining that the reroute request is one of a predetermined number of consecutive reroute requests to avoid the first road, and flagging the first road as closed if the reroute request is one of a predetermined number of reroute requests to avoid the first road.

3. The method of providing turn-by-turn navigation instructions according to claim 1, wherein determining whether the first road is closed based at least in part on the reroute request further comprises determining that with the reroute request, a statistically significant number of users routed to the first road have requested a reroute away from the first road, and flagging the first road as closed if, with the reroute request, a statistically significant number of users routed to the road have requested a reroute away from the first road.

4. The method of providing turn-by-turn navigation instructions according to claim 1, wherein it is determined that the first road is closed, the method further comprising:
   receiving a routing request from a second user for turn-by-turn directions;
   calculating third turn-by-turn directions for the second user by treating the first road as closed such that the turn-by-turn directions for the second user do not include travel on the first road; and
   receiving a reroute request from the second user indicating that the second user is traveling on the first road, and flagging the first road as open based on at least one predetermined criterion.

5. The method of providing turn-by-turn navigation instructions according to claim 4, wherein flagging the first road as open based on at least one predetermined criterion includes:
- calculating a fourth set of turn-by-turn directions based on the reroute request from the second user, the fourth set of turn-by-turn directions defining a second user route and containing the first road;
- providing the fourth set of turn-by-turn directions to the second user;
- waiting for an estimated travel time to elapse after which the user will have traveled past the first road; and
- flagging the first road as open if a reroute request from the second user to avoid the first road has not been received after waiting for the estimated travel time to elapse.

6. The method of providing turn-by-turn navigation instructions according to claim 1, wherein determining whether a first road on a portion of the first route not yet reached by the user is closed based at least in part on the reroute request comprises:
- determining that the first road is of a first road type;
- determining that the user has previously requested at least one reroute to avoid a road of the first type;
- determining that the first road is open based on actions of other users; and
- setting a user preference for the user to avoid roads of the first type.

7. The method of providing turn-by-turn navigation instructions according to claim 6, wherein the first road type is one of toll roads, mountain roads, and highway roads.

8. The method of providing turn-by-turn navigation instructions according to claim 1, wherein receiving at a call center a request from a user of a vehicle navigation device to receive navigational instructions comprises receiving the request from a telematics unit within a vehicle associated with the user.

9. A method for providing turn-by-turn navigation instructions to a particular user of a vehicle having an in-vehicle telematics unit, the telematics unit configured to send navigation assistance requests and to receive navigation assistance, the method comprising:
- tracking, at a server at a call center, navigation route direction requests and navigation re-route direction requests from a plurality of vehicle users;
- determining, at the server, based on the tracked navigation route direction requests and navigation re-route direction requests from the plurality of vehicle users that a first road is closed;
- receiving, at the call center, a navigation route direction request from the in-vehicle telematics unit of the vehicle associated with the particular user to provide turn-by-turn route directions from an originating location to a destination location; and
- calculating a set of turn-by-turn route directions defining a first route from the originating location to the destination location based on the determining that the first road is closed.

10. The method for providing turn-by-turn navigation instructions according to claim 9, further comprising receiving a reroute request from the user at a point on the first route indicating that the first road is open.

11. The method for providing turn-by-turn navigation instructions according to claim 10, further comprising:
- calculating a second set of turn-by-turn navigation instructions defining a second route between the originating location and the destination location based on the reroute request, wherein the second route include the first road; and
- providing the second set of turn-by-turn navigation instructions to the user.

12. The method for providing turn-by-turn navigation instructions according to claim 11, further comprising determining that the first road is open if the reroute request of the particular user is one of a predetermined number of reroute requests to use the first road.

13. The method for providing turn-by-turn navigation instructions according to claim 11, further comprising determining that the first road is open if the reroute request of the particular user is one of a statistically significant number of requests that require use of the first road.

14. The method for providing turn-by-turn navigation instructions according to claim 11, further comprising waiting for an estimated travel time to elapse after which the user will have traveled past the first road and determining that the first road is open after the estimated travel time has elapsed without receipt of another reroute request from the particular user.

15. A method for providing turn-by-turn navigation instructions to a user of a vehicle having an in-vehicle telematics unit for sending navigation assistance requests and receiving navigation assistance, the method comprising:
- receiving, at a server from the in-vehicle telematics unit of the vehicle, a navigation route direction request from the in-vehicle telematics unit of the vehicle associated with the particular user to provide turn-by-turn route directions from an originating location to a destination location, and in response providing turn-by-turn route directions corresponding to a first route to the user, wherein the first route includes a first road of a first road type;
- receiving, at a server from the in-vehicle telematics unit of the vehicle, a reroute request from the in-vehicle telematics unit of the vehicle associated with the particular user to provide alternate turn-by-turn route directions from a current vehicle location to the destination location, wherein the alternate directions do not include the first road;
- determining, based on navigation route direction requests and navigation re-route direction requests from a plurality of other vehicle telematics units, that the first road is not closed; and
- setting a user preference for the particular user of the in-vehicle telematics unit to avoid roads of the first type in response to the determining that the first road is not closed.

16. The method for providing turn-by-turn navigation instructions according to claim 15, wherein determining based on navigation route direction requests and navigation re-route direction requests from a plurality of other vehicle telematics units that the first road is not closed comprises:
- receiving a request for navigation assistance from at least one of the plurality of other vehicle telematics units, for which responsive turn-by-turn directions define a route that does not include the first road; and
- receiving a reroute request from the at least one of the plurality of other vehicle telematics units for an alternate route that does include the first road.

17. The method for providing turn-by-turn navigation instructions according to claim 15, wherein determining based on navigation route direction requests and navigation re-route direction requests from a plurality of other vehicle telematics units that the first road is not closed comprises:

receiving a request for navigation assistance from at least one of the plurality of other vehicle telematics units, for which responsive turn-by-turn directions define a route including the first road; and awaiting for an estimated travel time without receiving a reroute request from the at least one of the plurality of other vehicle telematics units.

18. The method of providing turn-by-turn navigation instructions according to claim 15, wherein the first road type is one of a toll road type, mountain road type, and highway road type.

19. The method of providing turn-by-turn navigation instructions according to claim 15, further comprising determining that more than a predetermined number of the plurality of other vehicle telematics units has requested a reroute to avoid the first road and in response setting a user preference for all users to avoid roads of the first type.

20. The method of providing turn-by-turn navigation instructions according to claim 15, further comprising determining that more than a predetermined number of the plurality of other vehicle telematics units has requested a reroute to avoid the first road and in response setting a user preference for all users to avoid the first road.

\* \* \* \* \*